United States Patent
Cohen et al.

[19]

[11] Patent Number: 5,950,189
[45] Date of Patent: Sep. 7, 1999

[54] RETRIEVAL SYSTEM AND METHOD

[75] Inventors: Edith Cohen, Berkeley Heights; David Dolan Lewis, Summit, both of N.J.

[73] Assignee: AT&T Corp, Middletown, N.J.

[21] Appl. No.: 08/775,913

[22] Filed: Jan. 2, 1997

[51] Int. Cl.$^6$ .................................................. G06F 17/30
[52] U.S. Cl. ........................................ 707/3; 707/4; 707/5
[58] Field of Search .................................. 707/1, 2, 3, 4, 707/5

[56] References Cited

U.S. PATENT DOCUMENTS

| | | | |
|---|---|---|---|
| 4,831,550 | 5/1989 | Katz | 364/513 |
| 5,212,765 | 5/1993 | Skeirik | 395/11 |
| 5,408,586 | 4/1995 | Skeirk | 395/23 |
| 5,488,725 | 1/1996 | Turtle et al. | 707/601 |
| 5,586,197 | 12/1996 | Tsujimura et al. | 382/162 |
| 5,675,786 | 10/1997 | McKee et al. | 707/103 |
| 5,696,964 | 12/1997 | Cox et al. | 707/5 |
| 5,713,016 | 1/1998 | Hill | 707/5 |

FOREIGN PATENT DOCUMENTS

93/23818  11/1993  WIPO ........................... G06F 15/401

*Primary Examiner*—Thomas G. Black
*Assistant Examiner*—Frantz Coby

[57] ABSTRACT

The invention is an improved retrieval system and method. Many pattern recognition tasks, including estimation, classification, and the finding of similar objects, make use of linear models. For example, many text retrieval systems represent queries as linear functions, and retrieve documents whose vector representation has a high dot product with the query. The fundamental operation in such tasks is the computation of the dot product between a query vector and a large database of instance vectors. Often instance vectors which have high dot products with the query are of interest. The invention relates to a random sampling based retrieval system that can identify, for any given query vector, those instance vectors which have large dot products, while avoiding explicit computation of all dot products.

8 Claims, 7 Drawing Sheets

PLOTS OF $(\hat{x}_i \cdot \hat{x}_j, \tilde{x}_i \cdot \tilde{x}_j)$ FOR ALL DOCUMENT PAIRS SUCH THAT $\hat{x}_i \cdot \hat{x}_j > 0.55$ (106K pairs)

FIG. 3

PLOTS OF $(\hat{x}_i \cdot \hat{x}_j, \tilde{x}_i \cdot \tilde{x}_j)$ FOR ALL PAIRS OF 500 DOCUMENTS

FIG. 4

PLOT FOR ALL POSITIVE/ORIGINAL DOT PRODUCTS
OF 156 NORMALIZED VECTORS FROM ISOLET DATA SETS

FIG. 5

| ALG: H,T | CPU TIME | # SAMPLES | # DOT-PRODUCTS | 0.55 | 0.60 | 0.65 | 0.70 | 0.75 | 0.80 | 0.85 |
|---|---|---|---|---|---|---|---|---|---|---|
| FULL | 1h1m47.84s | 0 | 25000000 | 106368 | 68872 | 44412 | 28320 | 17688 | 11256 | 7568 |
| R1 50, 30 | 7m3.06s | 450181950 | 657121 | 90620 | 62216 | 41842 | 27403 | 17410 | 11184 | 7549 |
| R2 50, 25 | 11m58.85s | 450181950 | 2625280 | 103306 | 67784 | 44061 | 28217 | 17667 | 11256 | 7568 |
| R3 60, 30 | 11m54.77s | 540218340 | 2284815 | 104339 | 68223 | 44218 | 28259 | 17674 | 11255 | 7568 |
| R4 60, 25 | 23m38.27s | 540218340 | 6934072 | 106201 | 68829 | 44402 | 28320 | 17688 | 11256 | 7568 |
| R5 80, 40 | 12m35.44s | 720291129 | 1879159 | 105153 | 68554 | 44343 | 28305 | 18786 | 11256 | 7568 |

FIG. 6

| ALG: H, T | CPU TIME | #PREAMPLES | #SAMPLES | #DOT-PRODUCTS |
|---|---|---|---|---|
| FULL | 37m45.68s | | | 491641929 |
| R1 60, 10 | 9m27.14s | 2266396 | 392812060 | 2043813 |
| R2 60, 7 | 11m53.50s | 2266396 | 392812060 | 5603726 |
| R3 100, 15 | 10m22.12s | 3307053 | 498441200 | 1317467 |
| R4 100, 11 | 11m59.68s | 3307053 | 498441200 | 3295974 |
| R5 40, 8 | 7m49.17s | 1526426 | 273542120 | 1486735 |

| ALG: H, T | 0.15 | 0.20 | 0.25 | 0.30 | 0.35 | 0.40 | 0.45 | 0.50 |
|---|---|---|---|---|---|---|---|---|
| FULL | 1755221 | 550871 | 243193 | 142323 | 97035 | 71969 | 54921 | 43559 |
| R1 60, 10 | 0.641 | 0.885 | 0.975 | 0.995 | 0.999 | 1.000 | 1.000 | 1.000 |
| R2 60, 7 | 0.891 | 0.979 | 0.997 | 1.000 | 1.000 | 1.000 | 1.000 | 1.000 |
| R3 100, 15 | 0.480 | 0.749 | 0.906 | 0.970 | 0.992 | 0.998 | 0.999 | 1.000 |
| R4 100, 11 | 0.763 | 0.919 | 0.978 | 0.995 | 0.999 | 1.000 | 1.000 | 1.000 |
| R5 40, 8 | 0.494 | 0.763 | 0.918 | 0.976 | 0.994 | 0.998 | 0.999 | 1.000 |

FIG. 7

| ALG: H, K' | TIME | 1NN | 2NN | 3NN | 4NN | 5NN | 6NN | 7NN | 8NN | 9NN |
|---|---|---|---|---|---|---|---|---|---|---|
| FULL | 43m11.43s | | | | | | | | | |
| R1 30, 40 | 6m57.17s | 0.836 | 0.642 | 0.478 | 0.355 | 0.264 | 0.200 | 0.154 | 0.119 | 0.030 |
| R4 40, 50 | 8m17.12s | 0.901 | 0.764 | 0.625 | 0.507 | 0.409 | 0.332 | 0.271 | 0.221 | 0.181 |
| R2 50, 50 | 9m15.80s | 0.929 | 0.817 | 0.700 | 0.593 | 0.492 | 0.410 | 0.343 | 0.288 | 0.240 |
| R5 50, 100 | 10m35.81s | 0.956 | 0.881 | 0.795 | 0.709 | 0.624 | 0.548 | 0.481 | 0.423 | 0.371 |
| R6 100, 100 | 11m39.47s | 0.970 | 0.916 | 0.854 | 0.785 | 0.720 | 0.659 | 0.599 | 0.546 | 0.498 |
| R8 140, 50 | 10m51.54s | 0.956 | 0.886 | 0.805 | 0.725 | 0.649 | 0.580 | 0.518 | 0.458 | 0.402 |
| R2+R4 | | 0.972 | 0.922 | 0.859 | 0.793 | 0.722 | 0.657 | 0.592 | 0.531 | 0.479 |
| R5+R6 | | 0.992 | 0.976 | 0.951 | 0.922 | 0.889 | 0.851 | 0.813 | 0.775 | 0.738 |

FIG. 8

RETRIEVAL SYSTEM AND METHOD

FIELD OF THE INVENTION

The invention relates to information retrieval technology.

BACKGROUND OF THE INVENTION

In pattern recognition or retrieval tasks, a database of empirical data to be processed (images, signals, documents, etc.) is commonly represented as a set of a vectors $x_1, \ldots, x_n$ of numeric feature values. Examples of feature values include the number of times a word occurs in a document, the coordinates of the center of mass of black pixels in an image, or the set of spectral coefficients output by a speech analyzer.

In the art, the desired processing of sampled empirical data or instances is often implemented using linear models. The knowledge required to carry out the processing is captured in a vector of numeric weights, $q=(q_1, q_2, \ldots, q_d)$. Each instance is processed by taking the dot product of the weight vector q with each of the vectors $x_1, \ldots, x_n$ of feature values. The weights in q may be set by hand, or by supervised learning from training data, so that the products $q \cdot x_i$ satisfy some desired goal. In classification problems, the goal is that values of $q \cdot x_i$ are high when $x_i$ is "related" to or lies within a particular class represented by q. In regression problems, the goal is that $q \cdot x_i$ approximate some numeric value associated with instance $x_i$.

In some cases, computing the proximity of one instance to another can be cast in linear form. For instance, if q and x are normalized to have Euclidean norm of 1.0 and are viewed as unit length vectors, then $q \cdot x$ is the cosine of the angle between them, a commonly used proximity measure. (In this case, the roles of instance vector and weight vector are interchangeable.)

These pattern recognition or retrieval systems are applied, for instance, in statistical information retrieval systems. Documents and queries are represented as vectors of terms or features. The user query can be treated as a sample document, whose similarity to database documents must be found (see G. Salton and M. J. McGill, "Introduction to Modern Information Retrieval", McGraw-Hill, New York 1983), or it can be used as evidence toward setting the parameters of a probabilistic classification function, which is then applied to database documents (see S. E. Robertson and K. S. Jones, "Relevance Weighting of Search Terms", Journal of the American Society for Information Science, May-June 1976). In both cases, linear models are widely used and continue to be developed (see D. D. Lewis, et al. "Training Algorithms for Linear Text Classifiers, Proceedings of the 19th Annual International ACM SIEIR Conference, 1996).

Applying a weight vector q to a database of instance vectors means computing the vector by matrix product $q^T A^T$, where A is a matrix whose rows $\{x_1, \ldots, x_n\}$ are the instance vectors. The value of the ith entry of $q^T A^T$ corresponds to the similarity of the instances represented by q and $x_i$. Computing the cosine proximity measure among all pairs of instances is equivalent to computing the matrix product $AA^T$. Calculations of this sort are common in the art, but expensive. In text retrieval, for example, the number of instances (documents) can be $10^4$ to $10^6$ and the number of features (words or phrases) may be 100,000 or more. This is an expensive task in terms of computing resources, even when utilizing reductive sparse matrix and indexing techniques. Dense instances with hundreds of features are also common, for example, with factor analytic text representations or in image retrieval. There is therefore a need for ever more efficient recognition and retrieval technology.

SUMMARY OF THE INVENTION

The invention solving these and other problems in the prior art relates to a random-sampling based retrieval system that identifies high-valued entries of nonnegative matrix products, without the need for full computation of the product. The system assigns scores to each entry of $q^T A^T$. In contrast to some existing approximate scoring techniques (see H. Turtle and J. Flood, "Query Evaluation: Strategies and Optimizations", Information Processing and Management Vol. 24(5), 1988), the expected value of the scores is equal to the true value that would be obtained with the full computation. Furthermore, the variance of the scores is independent of the weight distribution of the instance vectors. It depends only on the (relative) value of the entry and decreases for higher-valued entries. Among other features and advantages, the improved retrieval system of the invention allows retrieval and recognition tasks to be carried out on a physically smaller set of database storage information, and processor computation, including floating-point calculation, is reduced.

DETAILED DESCRIPTION OF THE PREFERRED EMBODIMENTS

As illustrated in FIGS. 1–8, the improved retrieval system 10 of the invention generally relates to processing of a database 20, generally referred to as "A" herein. Database 20 may represent text, numerical data, digitized images or sound, or other information, generally stored in matrix fashion. The content of A may be stored on hard drive, optical drive or other storage media, or could be accessed online.

Figure 1:
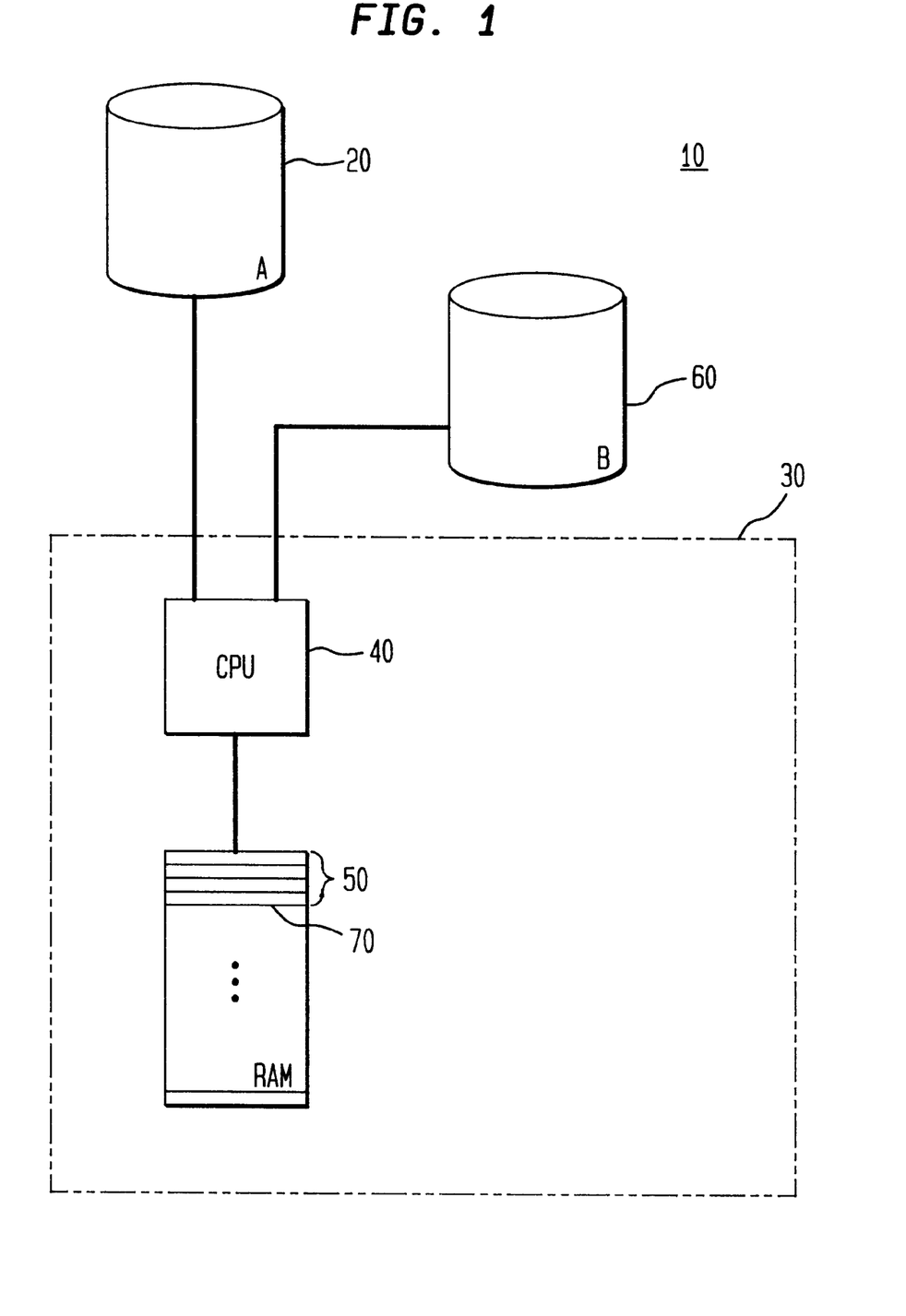
FIG. 1 illustrates a schematic diagram of the improved retrieval system of the invention.

In the improved retrieval system 10 of the invention, database 20 is processed by retrieval processing unit 30. Retrieval processing unit 30 illustratively consists of a CPU 40, linked by an appropriate bus to database 20 and having random-access memory 50, which is typically at least on the order of megabytes of storage.

Retrieval processing unit 30 operates under program control to analyze and treat the entity A, according to the following description and principles. Persons skilled in the art will appreciate that programming of retrieval processing under 30 by sets of instructions to operate CPU 40 are known in the art, as for example C, C++, or other appropriate coding, B, which may be stored in program storage 60. However, it will also be appreciated by persons skilled in the art that retrieval processing unit 30 could suitably be implemented by dedicated special-purpose hardware, or other circuitry. When retrieval or recognition results are prepared by the improved retrieval system 10, they may be presented to the user immediately by way of a monitor (CRT or otherwise, not shown) or recorded in storage area 20, 60, or on other disk, tape, optical or other media.

In pattern recognition applications, the exact value of q·x is not critical, and in the invention approximate dot products can be used instead of true ones. For instance, the values that vectors have on each dimension are often set by coarse heuristics, with the result that small differences in dot products between vectors have little consequence. Furthermore, many tasks do not require exact values. In a classification task, it may only need to be known whether q·x exceeds some threshold value for class membership. In an information retrieval system, for instance, only the documents with the 10 highest scores may be desired for display to the user, without needing exact knowledge of the score of any document. Advantageously, the invention is also applicable when exact top values are needed, for example, when the goal is to identify the 10 nearest neighbors. In such tasks, the scores are used to identify a small set of entries that are likely to have large values or to contain all relevant values. The exact dot product evaluation is carried out only for these selected entries.

The running time for execution of retrieval in the invention depends on the accuracy required for the task at hand, and on the distribution of the scored values. The system of the invention is particularly suited for problems where a typical query q has a small number of relevant instances (high dot product values) and the bulk of instances have significantly smaller values. As a rough "asymptotic" comparison, the exact computation of all dot products requires O(dn) operations (for dense instances). The system of the invention, for the task of isolating the highest dot product (possibly with some others), performs $$O\left(\frac{\sum_{i=1}^{n}[q^T A^T]_i}{\max_i [q^T A^T]_i}\right)$$

(at most O(n)) operations. Furthermore, each sampling operation is simpler: memory access and a counter increment, versus a floating-point multiply-add. In experiments with large information retrieval datasets, the inventors have demonstrated speedups of 5 to 15 fold without significantly compromising the accuracy of the results.

It is significant to note that the improved retrieval system 10 of the invention applies directly only to nonnegative vectors and matrices. Nonnegativity is common, but not universal in pattern recognition tasks. Negative values may arise when one of the vectors is a linear classifier or regression function. Negative values in example representations are less common, but occur in signal processing tasks and occasionally even in text processing. Herein, a scheme for identifying large dot product values for real-valued matrices is described. Considerable speedups with negligible loss of accuracy for the data sets examined, have been demonstrated.

1. The vectors are transformed to a nonnegative form. On data examined, the "positive" dot products values are highly correlated with the original dot product values. The inventors conjecture that this dependence is common.
2. A sampling algorithm is used to identify vectors with high "positive" dot products.
3. The exact original dot products are explicitly computed only for (the small set of) vectors with high "positive" scores.

A variety of tasks involve finding examples in close proximity to other examples, and may be processed using improved retrieval system 10. This may be a goal in itself, or may be a means of performing classification or regression. Frequently seen proximity problems are closest pair, nearest neighbors, and bichromatic nearest neighbors. A variety of proximity measures can be used in such tasks. As mentioned above, the cosine correlation can be implemented directly as a dot product. Another common measure is the Euclidean distance, which is related to the dot product as follows:

$$\|u-v\|^2=\|u\|^2+\|v\|^2-2u\cdot v.$$

Hence, for normalized vectors, large cosines identify small distances. Simple reductions can handle different size norms. The caveat is that the system of the invention can not distinguish between very near neighbors (that is, between points within some $\epsilon$-neighborhood of a point, where $\epsilon$ is a small fraction of the norm). Hence, it is useful in data where the $\epsilon$-neighborhoods are not very large or in applications where most of the near neighbors are relevant and are far from the bulk of irrelevant points.

These proximity problems (likewise, computing all dot products) are trivially solvable in $O(dn^2)$ time (for dense data, for sparse data the time depends on the nonzero structure). Some known algorithms perform better when the dimension d is very small. Bentley et al. (J. L. Bentley et al., "Optimal Expected-Time Algorithms for Closest Point Problems", ACM Trans. Math Software, Vol. 6, 1980) have showed better expected asymptotic performance for instances where the dimension is constant, and the vectors are randomly sampled from certain distributions. Arya et al. (S. Arya et al., "an Optimal Algorithm for Approximate Nearest Neighbor Searching", proceedings of $5^{th}$ ACM-SIAM Symposium on Discrete Algorithms, ACM-SIAM, 1994) established better worst-case performance for constant dimension, by allowing approximation. They presented an O(n log n) time algorithm that computes (1+$\epsilon$)-nearest neighbors (for any fixed constant $\epsilon$ and d.) The running time of these algorithms is near-linear in n, but exhibits exponential dependence on d. For high dimensions, even for the average or approximate problems, the $O(dn^2)$ bound is the best known (short of using fast matrix multiplication). The improved retrieval system of the present invention exhibits significantly faster running times for many "real" instances.

In terms of preprocessing a sampling carried out by the system of the invention, consider a product $$P^{n_1 \times n_{k+1}} = A_1^{n_1 \times n_2} \ldots A_k^{n_k \times n_{k+1}}$$

of $k \geq 2$ nonnegative matrices. Sampling in the invention inputs the matrices $A_1, \ldots, A_k$ of database 20 and performs the following manipulations:

● Preprocessing stage: Requires linear time in the number of nonzero entries in $A_2, \ldots, A_k$.
● Scoring a row: Input i$\in\{1, \ldots, n_1\}$, S
—Process ith row: in linear time in the number of nonzeros in [A]i the row is processed and $$M_i = \Sigma_{h=1}^{n_{k+1}}[P]_{ih} \text{ is computed.}$$

—Determine the number of samples S: S can be obtained s input, determined online, or computed using Mi and some accuracy criteria.

—sample. Repeat S times: (O(k) time per sample)
return an index j∈[1, ..., nk+1] such that j is selected
with probability $$\frac{[P]_{ij}}{\sum_{h=1}^{n_{k+1}} [P]_{ih}}$$

The processing of the rows of $A_1$ of database 20 is independent of the preprocessing. Therefore, this approach is applicable in an online setting, where the matrices $A_2, \ldots, A_k$ are fixed, and vectors $q \in \Re^{n_2}$ are presented online (this can be viewed as supplying the matrix $A_1$ online row by row). When an online implementation of the invention is presented with a vector q, the processing takes linear time in the number of nonzeros of q and the sampling takes (O(k) time per sample.

Consider an input vector q (or a row of $A_1$ of database 20) and let S be the number of samples. The algorithm returns a score vector $(S_1, \ldots, S_{n_{k+1}})$, computed in retrieval processing unit 30, where $S_j$, the score of $j \in \{1, \ldots n_{k+1}\}$ is the number of times j was sampled $(S = \Sigma_{j=1}^{n_{k+1}} S_j)$. Let $m = q^T A_2 \ldots A_k = (m_1, \ldots, m_{n_{k+1}})$. The samples provide information about the weight distribution of m in a fraction of the time needed to compute m explicitly. $M = \Sigma_{h=1}^{n_{k+1}} m_h$ is computed while processing q. The expected value of $S_j$ equals $m_j S/M$. Hence, $S_j M/s$ an unbiased estimator for $m_j$.

The preprocessing stage in the invention constructs a k+1-layer directed graph, where edges are directed from layer j to layer j+1 and all edges are assigned transition probabilities. A sample for row i of $A_1$ is obtained by a random walk from the ith node in the first layer to the (k+1)st layer. (The index of the last node reached constitutes the sample.) This graphing structure may for instance be calculated in RAM 50.

In terms of graphical representation of matrices and matrix products, matrix A of dimension $n_1 \times n_2$ is represented by a weighted directed bipartite graph $G_A$, with $n_1$ nodes $\{v_1, \ldots, v_1\}$ at the lower level and $n_2$ nodes $\{v_1, \ldots, v_{n_2}^1\}$ at the upper level. For $1 \leq i \leq n_1$ and $1 \leq j \leq n_2$, there is a directed edge from $v_i$ to $v_j$ if and only if $A_{ij} \neq 0$. The weight w(e) of the edge $e = (v_i$ to $v_j)$ is $A_{ij}$. It will be appreciated by persons skilled in the art that the outdegree of $v_i$ (resp., indegree of $v_j$) is the number of nonzeros in the ith row (resp., jth column) of A. The sum of the weights of edges incident to $v_i$ is the weight of the ith row.

The matrix product $P = A_1 \ldots A_k$ (where $A_i$ is of dimensions $n_i \times n_{i+1}$) is represented as a layered graph with (k+1) layers. For $1 \leq i \leq k+1$, the ith layer has $n_i$ nodes and the edges between the ith and the (i+1)st layers are as in the bipartite graph $G_{A_i}$. For $1 \leq i \leq k+1$, let $V_i = \{v_1^i, v_2^i, \ldots, v_{n_i}^i\}$ be the set of nodes at layer i.

The improved retrieval system 10 of the invention assigns probabilities p:E to the edges of the product graph, such that random walks from node $v_1^i \in V_1$ to layer $V_{k+1}$, according to the edge probabilities, correspond to samples. The probabilities are computed by first computing, for every $1 \leq i \leq n_j$ in every subproduct, $A_j \ldots A_k (1 \leq j \leq k)$, the sum $W_j^i = \Sigma_{h=1}^{n_{k+1}} [A_j \ldots A_k]_{ih}$ (the weight of the ith row of $A_j \ldots A_k$). We denote $W_j^i = W(v_j^i)$.

- Compute $W_j^i$.
  1. layer k nodes: For $1 \leq j \leq n_k$, set $W_j^{k} = \Sigma_{h=1}^{n_{k+1}} [A_k]_{jh}$ (the sum of the weights of out-going edges from $v_j^k$ to $V^{k+1}$).
  2. For i=k-1 down to 1: (ith layer nodes)
    For every node $v_j^i$ in layer i, set $W_j^i$ to the sum of the products $w(v_j^i, u) W(u)$, for all u such that is an outgoing edge to $V^{i+1}$.

- Assign Probabilities
  For every pair of nodes $\{v_j^i, v_l^{i+1}\}$ such that the edge $e = (v_j^i, v_l^{i+1})$ exists, set $$p(e) \equiv p_{jl}^i = \frac{w(e) W_l^{i+1}}{W_j^i}.$$

To sample S times from the ith row of P: Trace S random walks from $v_i^1$ to layer k+1. For $1 \leq j \leq n_{k+1}$ let $S_j$, the score of j, be the number of random walks that terminated in $v_j^{k+1}$. The quantity of $$S_j \frac{W_i^1}{S}$$

has expected value $[P]_{ij}$.

It can be shown that the running time is as claimed. The correctness is established by the propositions below.

Proposition 2.2 For $i = 1, \ldots, k$ and $1 \leq j \leq n_i$, $$W_j^i = \Sigma_{h=1}^{n_{k+1}} [A_1 \ldots A_k]_{jh}.$$

Proof. By downward induction on $i = k, k+1, \ldots, 1$. Immediate for $i = k$. Assume the proposition holds for $i > l$ We have $$W_j^l = \sum_{r=1}^{n_{l+1}} w(v_j^l, v_r^{l+1}) W_r^{l+1}$$

$$= \sum_{r=1}^{n_{l+1}} [A_l]_{jr} \sum_{h=1}^{n_{k+1}} [A_{l+1} \ldots A_k]_{rh}$$

$$= \sum_{h=1}^{n_{k+1}} \sum_{r=1}^{n_{l+1}} [A_l]_{jr} [A_{l+1} \ldots A_k]_{rh} = \sum_{h=1}^{n_{k+1}} [A_l \ldots A_k]_{jh}$$

Proposition 2.3. The probability that a random walk from node $v_j^l$ at layer $l (1 \leq l \leq k)$ terminates at the node $$v_i^{k+1} \text{ is } \cdot \frac{[A_l \ldots A_k]_{ji}}{\sum_{h=1}^{n_{k+1}} [A_l \ldots A_k]_{jh}}.$$

Proof. By downward induction on l. Immediate for l=k: the probability to an edge $(v_j^k, v_i^{k+1})$ equals $$\frac{[A_k]_{ji}}{\sum_{h=1}^{n_{k+1}} [A_k]_{jh}}.$$

Assume the proposition holds for l>r. The probability that a random walk from $v_j^r$ ends at $v_i^{k+1}$ equals $$\sum_{q=1}^{n_{r+1}} p_{jq}^r \frac{[A_{r+1} \ldots A_k]_{qi}}{\sum_h [A_{r+1} \ldots A_k]_{qh}}.$$

Proposition 2.2 asserts that $$p^r_{jp} = [A_r]_{jp} \frac{W^{r+1}_q}{W^r_j} = [A_r]_{jq} \frac{\sum_{h=1}^{n_{k+1}} [A_{r+1}...A_k]_{qh}}{\sum_{h=1}^{n_{k+1}} [A_r...A_k]_{jh}}.$$

Hence, the probability that the walk terminates at $v_i^{k+1}$ is $$\frac{\sum_{q=1}^{n_{r+1}} [A_r]_{jp} [A_{r+1}...A_k]_{qi}}{\sum_{h=1}^{n_{k+1}} [A_r...A_k]_{jh}} = \frac{[A_r...A_k]_{ji}}{\sum_{h=1}^{n_{k+1}} [A_r...A_k]_{jh}}.$$

This concludes the proof of running time parameters in the invention, in this regard.

In terms of accuracy and variance of scores, in the operation of the system of the invention consider some row $i \in \{1, \ldots, n_{k+1}\}$ of P. Let $$p_j = \frac{[P]_{ij}}{\sum_{h=1}^{n_k} [P]_{ih}}$$

denote the probability that a single sample is j. $S_j$ has a binomial distribution with parameters S and $p_j$. The expected value of $S_j$ is $Sp_j$. The probability that $S_{j=t}$ (j is sampled t times), as is known in the art, is $$\binom{S}{t} p_j^t (1 - p_j)^{S-t}.$$

Using the normal approximation, $$\text{Prob}\{S_j \geq T\} = 1 - \Phi\left(\frac{T - 0.5 - Sp_j}{\sqrt{Sp_j(1-p_j)}}\right)$$

Equation (2.1)

$$\text{Prob}\{S_j < T\} = \Phi\left(\frac{T + 0.5 - Sp_j}{\sqrt{Sp_j(1-p_j)}}\right).$$

In terms of practical implementation, for the applications discussed here the sampling algorithm for products of k=2 non-negative matrices is applied. Generally, there is a database matrix $A^{d \times n}$, where n is the number of instances and d is the number of features. Query vectors of dimension d are either provided beforehand or presented online to improved retrieval system 10. For an input query q and a parameter S (number of samples), the system of the invention using CPU 40 computes a (possibly sparse) integral score vector $(S_1, \ldots, S_n)$ where $S_i$ is the number of times i was sampled.

The sampling approach employed in the system of the invention has efficient implementations for either dense or sparse matrices (sparsity is fully exploited). The system of the invention effectively replaces the database matrix A by a set of lists 70 $L_1, \ldots, L_d$ of indices $\{1, \ldots, n\}$ of sampled instances. For each input query q the system 10 first processes q to determine how many samples are needed, from each of the d lists $L_i$ contained in list 70. It then retrieves these samples from the appropriate stored lists, and counts how many times each of $\{1, \ldots, n\}$ was sampled. Presampling improves performance because the same samples are used for different queries. Hence, while evaluating a query, each sample amounts to a memory lookup, a simpler operation that replaces drawing randomly from a specified distribution.

The list size $l_i = |L_i|(i=1, \ldots n)$ is selected to be the maximum number of samples from $L_i$ expected to be required by a query. In experiments the inventors selected the $l_i$'s to be the maximum required when the database instances are used as queries. All sample matrices required considerably less storage than the original database matrix 20, a practical advantage in any system administration. One caveat of presampling is that it introduces correlations between results of independent queries (biases towards the same subset of instances). This dependency is not an issue in many applications. Furthermore, the correlation can be reduced by more presampling, and by using some randomization in the selection within each list.

Preprocessing: Generate the Sample Matrix
- For each row $1 \leq i \leq d$ of A:
  Compute the sum $a_i \leftarrow \Sigma_h [A]_{ih}$.
  Initialize $L_i$ to the empty list.
- Repeat $l_i$ times (desired number of samples):
  Draw an instance $j \in \{1, \ldots, n\}$ at random, where j has probability $$\frac{[A]_{ij}}{a_i}$$

and append it to the list $L_i$.

Process a Query Vector q (With S Samples):
1. For every $1 \leq j \leq d$ such that $$q_j \neq 0 : \text{let } q_j'^{40} \leftarrow q_j a_j. \; (\Sigma_j q_j'^{-\Sigma_h [q^T A]_h})$$

2. For each $1 \leq i \leq d$, determine the number of samples $c_i$ needed from the list $L_i$. ($S = \Sigma_i c_i$) We choose $c_i$ such that it has expected value $$\frac{Sq_i'}{\sum_{j=1}^{d} q_j'}:$$

$$c_i = \begin{cases} \left\lceil \frac{Sq_i'}{\sum_{j=1}^{d} q_j'} \right\rceil & \text{w/ prob. } \frac{Sq_i'}{\sum_{j=1}^{d} q_j'} - \left\lfloor \frac{Sq_i'}{\sum_{j} q_j'} \right\rfloor \\ \left\lfloor \frac{Sq_i'}{\sum_{j=1}^{d} q_j'} \right\rfloor & \text{w/ prob. } \frac{Sq_i'}{\sum_{j=1}^{d} q_j'} - \left\lfloor \frac{Sq_i'}{\sum_{j=1}^{d} q_j'} \right\rfloor \end{cases}$$

3. Scoring: For i=1, ..., d:
   Repeat $c_i$ times:
   - Let $s \in \{1, \ldots, n\}$ be the next sample in $L_i$.
   - If s is encountered for the first time: create a counter for s with value 1.
     Otherwise, increment the counter of s.
4. For $j \in \{1, \ldots n\}$, set $S_j$ (the score of j) to the value of the counter (if initialized), and 0 otherwise.

In the improved retrieval system of the invention, high scores correspond to high matches. This correspondence increases with the number of samples (see Equation 2.1). S is typically chosen as a function of the query vector, the desired output, and tradeoffs between time and accuracy.

Consider a query q and the match vector $m=q^T A$. Recall that the expected value of $S_i$ equals $Sm_i/M$, where $M=\Sigma_{j=1}^n m_j$ is computed by the scoring algorithm. The expected value of $S_i M/S$ equals $m_i$. Hence, to identify instances where $m_i \geq \alpha$ instances where $S_i M/S \approx \alpha$ (or $S_i M/S > \alpha - \epsilon \equiv T$) are considered. $S = H/M$ (where H is in the range 20–100) was used. The values of H and the threshold T determine exactly the probability of an instance with a certain value of $m_i$ to score above or below T. Hence, appropriate values can be set in advance for objectives such as "isolate a set with at least at least 90% of matches of value $\alpha$ and above and at most 10% of matches of value $\alpha-0.1$ and below". (Values are set for the "worst case" where $m_i \in \{\alpha, \alpha-0,1\}$, performance will be better when the distribution is more skewed.) In some cases it is worthwhile to determine S and T online. For example, if one objective is to isolate a set of instances with a high fraction of high matches, a clue on the distribution of the $m_i$'s is needed. Typically, there are very many instances with low match values and a small fraction of them, which could still be a significant number, have high scores. This number decreases with S. Hence, S can be determined online until a satisfactory fraction of the high scoring objects are high matches.

In some applications of the invention it is desirable to accurately identify the high matches and their exact values. To achieve this goal, the invention uses the scores obtained by the sampling algorithm in conjunction with dot products computations. First, sampling is used to identify and rule out instances that are extremely unlikely to be high matches. Then, the dot products of q with the remaining instances are computed. This yields considerable speedups over fully computing the product $q^T A$.

● Input: A query q and parameters T threshold and H Hit factor.
● Apply the sampling algorithm with $S=HM$ samples to obtain scores $(S1, \ldots S_n)$.
● Consider the subset $I \subset \{1, \ldots, n\}$ of objects with score that is at least T.
● Compute the dot product $q^T x_i$ for all $i \in I$ and identify the highest matches.

The choice of the parameters H and T determines a tradeoff between the size of the set I (the smaller the better), the number of high matches that are filtered out, and the cost of sampling.

By Equation 2.1, $$\text{Prob}\{i \in I\} = 1 - \Phi\left(\frac{T - 0.5 - Hm_i}{\sqrt{Hm_i(1 - m_i)}}\right)$$

$$\text{Prob}\{i \in I\} = \Phi\left(\frac{T + 0.5 - Hm_i}{\sqrt{Hm_i(1 - m_i)}}\right)$$

To obtain a small size set I, the threshold T should be such that T/H is larger than most values of $\{m_1, \ldots m_n\}$. On the other hand, T and H should be such that T/H is below the magnitude of the lowest match which is of interest. The likelihood that matches above $T/H+\epsilon$ are filtered out, or values below $T/H-\epsilon$ are in the set I, decreases with S.

As an experimental test of the system of the invention, the inventors chose the task of estimating the largest entries in each row of $A^T Am$ were each of the rows $\{X_1 \ldots X_n\}$ of A is the representation of a textual document as a set of numeric feature values. This finds, for each document, its set of nearest neighbors, under a dot product based proximity function. In information retrieval, such sets of nearest neighbors can be used to support hypertext browsing or in doing a cluster analysis of the data. Finding nearest neighbors has similar computational characteristics to running large numbers of queries or other linear classifiers against the document database.

Different methods of representing texts will give document matrices with very different properties. The first experimental result describes the challenging case, where the representation yields a dense matrix of real-valued document representation. All experiments were run under similar load conditions using one processor of a SGI Challenge computer with 1 gigabyte of RAM.

Several information retrieval approaches have been proposed in the prior art which model the observed matrix of document/word values as having a simpler underlying structure in terms of document clusters, word clusters, or latent factors. The most popular such approach is Latent Semantic Indexing (LSI) (see S. Deewestar, et al., "Indexing by Latent Semantic Indexing", Journal of American Society for Information Science, Vol. 41(6), September 1990), which is based on singular value decomposition techniques. The sparse document vectors $X_i \in \Re_+^1$ are replaced by dense d-dimensional vectors $\hat{x}_i \in \Re^d$ where $d << t$ (typically, d is of order $10^2$). The coordinates of $\hat{x}_i$ are linear combinations of the coordinates of $x_i$, that is, the decomposition provides a transformation matrix $T \in \Re^{t \times d}$ such that $\hat{x}_i = x^T T$ and hence, the new database matrix is $\hat{A} = AT$. The SVD decomposition guarantees that $\hat{A}\hat{A}^T$ is the best least-square approximation to $AA^T$ that can be provided by a rank d matrix $\hat{A} \in \Re^{n \times d}$. Values of d of a few hundred typically give the best effectiveness.

When using LSI for text retrieval, a user query is treated as a vector q of length t, and then transformed to a length d latent vector $\hat{q}(=q^T T)$. The goal then is to find the set of objects $I \subset \{1, \ldots, n\}$ such that $\hat{q} \cdot \hat{x}$ is large. This again amounts to identifying the largest entries in the product $\hat{q}\hat{A}^T$.

For the present experiment a collection of 5,000 encyclopedia articles was used for database 20, originally represented as a 5,000 by 75,714 matrix of term weights, similar to those used below. The LSI procedure was applied to this matrix, producing a dense 5,000 document by 320 factor matrix $\hat{A}$, where the euclidean norm of each document vector is normalized to 1. The invention was tested by attempting to find all large document-document matches, in this case all large values in $\hat{A}\hat{A}^T$.

As an aside concerning negative entries, even when (as is usual) the raw document-term matrix A is non-negative, it is possible that T and thus $\hat{A}$ contain negative entries. To address this, the invention preferably applies another transformation to the document or query vectors. For every such vector $\hat{q}$, $\tilde{q}$ is defined such that $$\tilde{q}_{2i} = \max\{0, \hat{q}_i\} \tag{4.2}$$

$$\tilde{q}_{2i+1} = -\min\{0, \hat{q}_i\} \tag{4.3}$$

Figure 2:
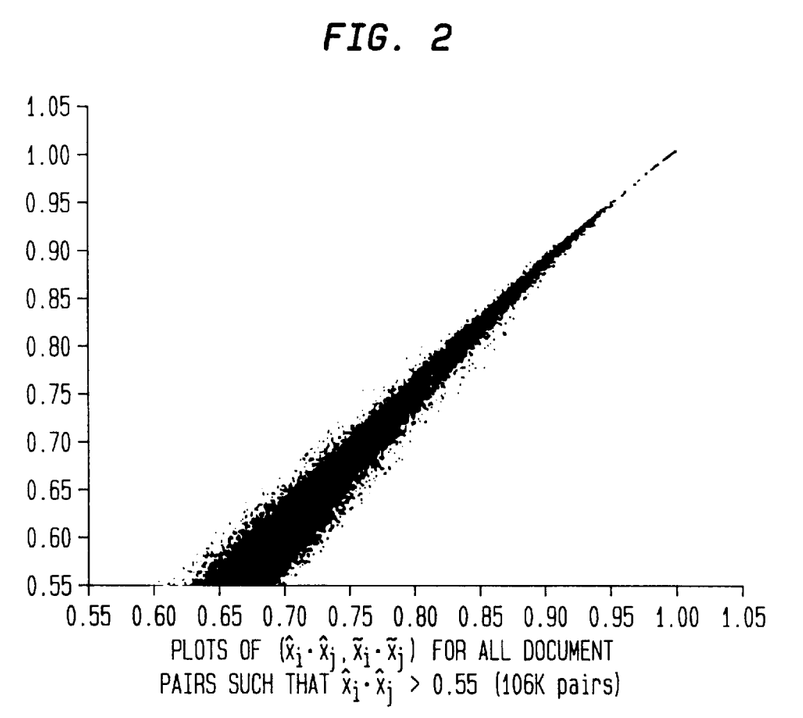
FIG. 2 illustrates a first set of experimental data related to the improved retrieval system of the invention.
Figure 3:
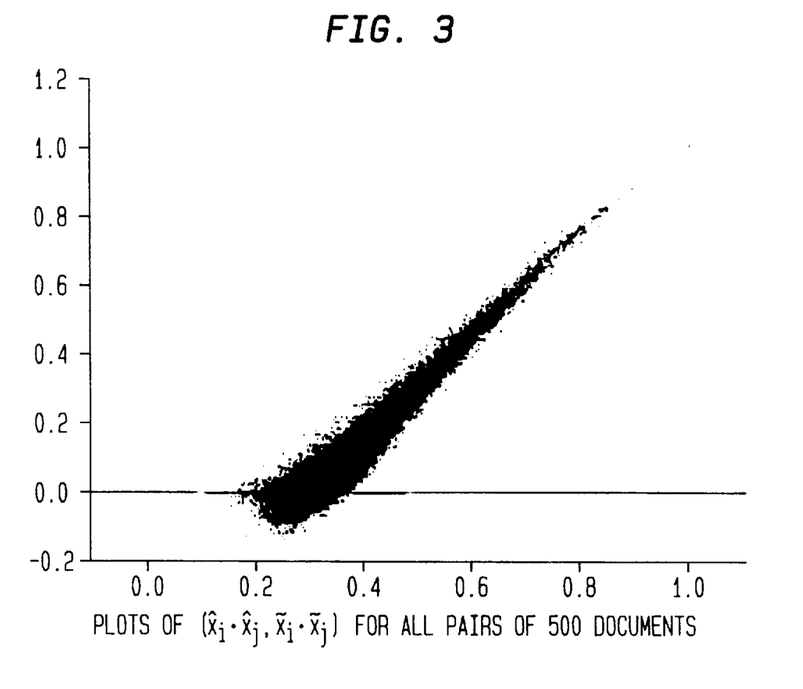
FIG. 3 illustrates a second set of experimental data related to the improved retrieval system of the invention.
Figure 4:
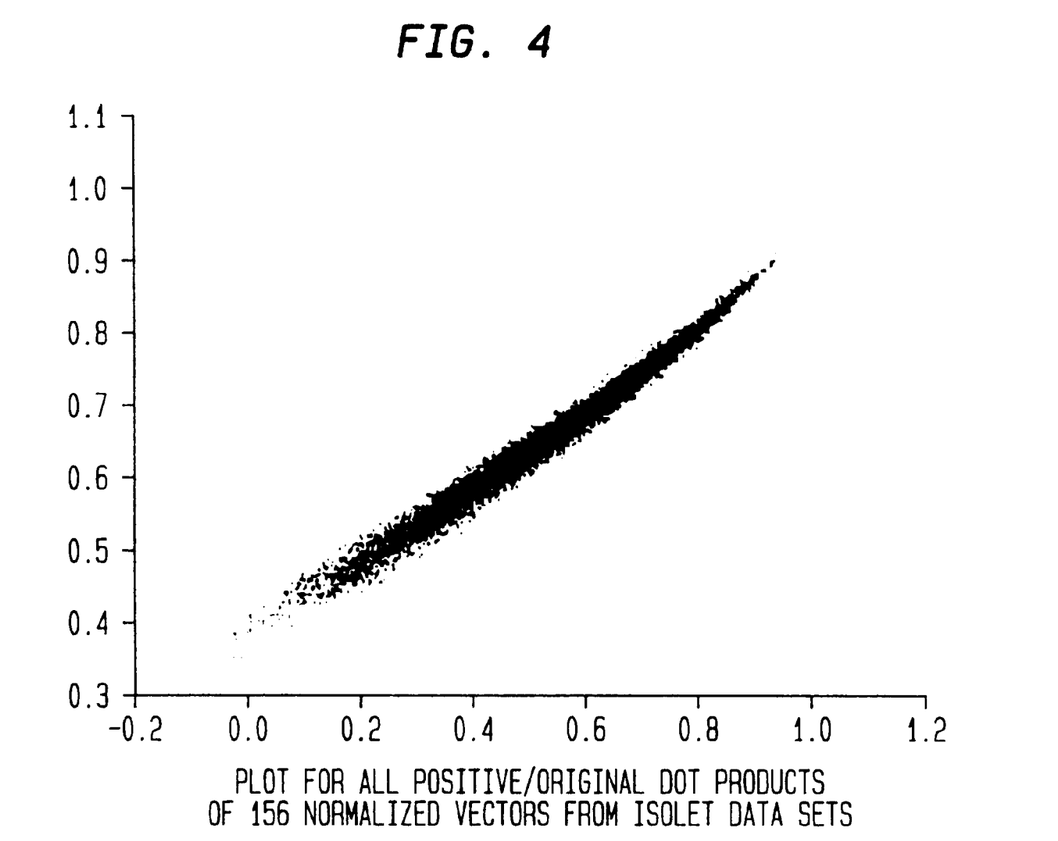
FIG. 4 illustrates a third set of experimental data related to the improved retrieval system of the invention.

Note that the vectors $\tilde{q}$ are non-negative. The product $\tilde{q} \cdot \tilde{x}_i$ is referred to as the positive contribution of the product $\tilde{q} \cdot \tilde{x}_i$. The sampling algorithm is applied to the non-negative database matrix $\tilde{A}^{n \times 2d}$ and non-negative query vectors $\tilde{q}$. It identifies (and scores) the objects with highest positive contributions. The exact (original) dot products are then explicitly computed for documents with high scores. The underlying assumption is that high positive contribution is highly correlated to high matches. This holds when different features are not independent (as is the case for datasets used by the inventors). The dependence for a dataset "ency320.5000" is visualized in FIGS. 2 and 3. FIG. 2 plots the positive contribution vs. dot product value for $106 \times 10^3$ document pairs with dot product above 0.55 in the dataset ency320.5000. FIG. 3 plots positive contribution vs. dot product for all pairs of 500 of the documents. In FIG. 4 this dependence is visualized for all pairs of 156 vectors from the Isolet data set (Isolated Letter Speech Recognition). Each vector corresponds to a voice sample of a spoken letter. Normalized vectors with 617 attributes were used.

A combined sampling and partial dot products computation (as described above) was applied to the dataset ency320.5000. A sampling algorithm with parameters H and T was first applied on the positive matrix $\tilde{A}$. That is, for a "query" $\tilde{q}$ (a row of $\tilde{A}^T$), we used $S=H(\tilde{q}^T\tilde{A})^T e$ samples were used. For all instances with score above T, the exact dot product value $(q \cdot x_i)$ was computed. The table in FIG. 5 lists results for several choices of the parameters H and T. For each choice the running time, number of samples used, the number of dot products computed (equals the number of objects with scores at least T), and the number of objects found with match at least 0.55, 0.6, . . . , 0.85 (recall that we used normalized vectors, hence all matches are in [0,1]) are listed. The first row of the table (algorithm Full) contains the performance data for the naive algorithm that computes all dot products. Note that each dot product computation amounts to 320 float multiply-adds, whereas each sampling step amounts to a memory lookup and a counter increment. Significant speedups are obtained with negligible loss of accuracy. For example, Algorithm R1 utilizes only 11% of the CPU time of Full and identifies 99.8%, 99.3%, 98.4%, 96.7%m 94.2% of the matches above 0.85, 0.80, 0.75, 0.70 and 0.65, respectively. Algorithm R5 utilizes 20% of the CPU time of Full and identifies 99% of matches over 0.55.

Figure 5:
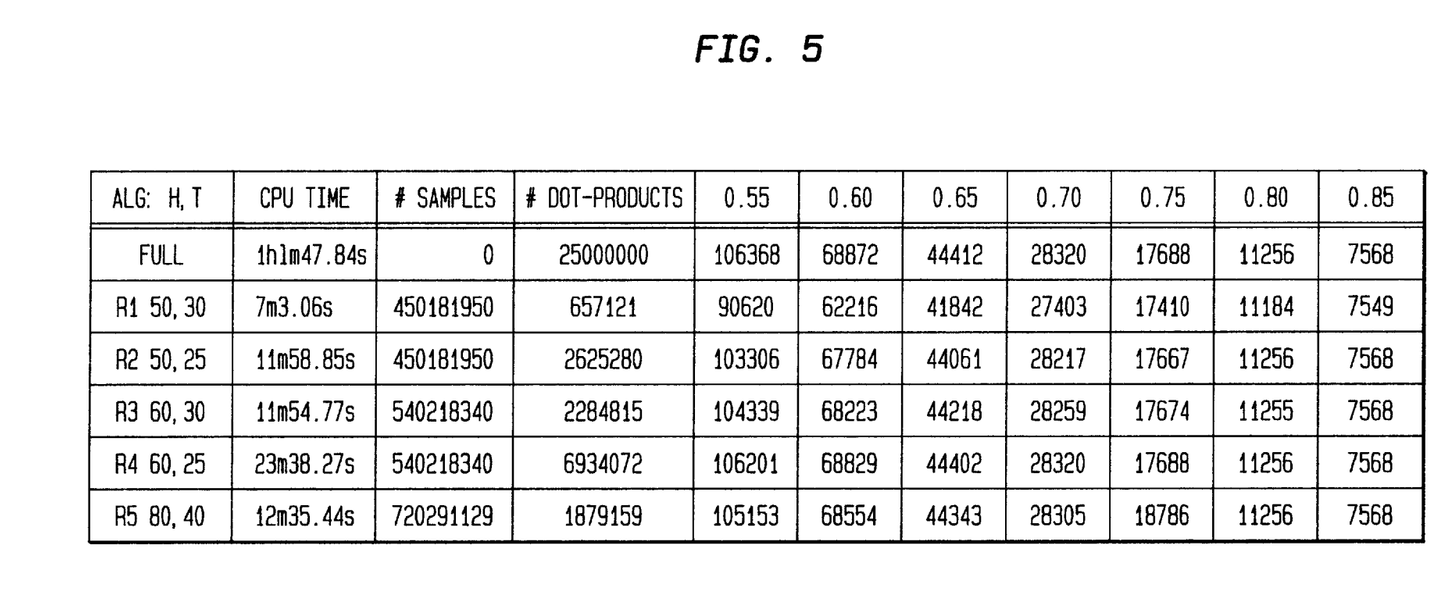
FIG. 5 illustrates a fourth set of experimental data related to the improved retrieval system of the invention.

Note that even though the scoring is with respect to the positive contributions of the dot products, the final dot products and the results in FIG. 5 are for the actual values. The sizes of the sample matrices (computed in the preprocessing) are 738,801 for R1 and R2, 886,563 for R3 and R4 and 1,182,037 for R1. Hence, the precomputed samples require small additional storage. These sizes also demonstrate the effectiveness of presampling.

As a second experiment, the improved retrieval system 10 was applied to a collection of 22,173 Reuters newswire articles. The matrix form of the data has 22,173 rows and 106,113 columns, with each column representing a word. Each matrix entry was a function of the word's frequency in the document, computed using the Cornell "ltc" weighting. This weighting formula has been shown to be effective in making proximity of document vectors correspond more closely to similarity of meaning (see C. Buckley et al., "The Effect of Adding Relevance Information", SIGIR 94: proceedings Springer-Varlag, London, 1994). The resulting matrix is sparse, with about $2 \times 10^6$ nonzeros. The vector for each document is normalized to have Euclidean norm of 1.0, so that dot product between two document vectors is their cosine correlation.

Information retrieval systems typically compute the dot product of a query vector with a collection of sparse document vectors by making use of an inverted file (see I. H. Witlan et al., "Managing GigaBytes", Von Nostraud Reinhold, New York, 1994) of document vectors. The inverted file is the appropriate storage for efficient sparse matrix multiplication. For each indexing term, a list of the id's of all documents with a nonzero weight for that term, plus the weights themselves, are stored. The dot product of a query vector with every document vector can be computed by examining only the inverted lists for those computed by examining only the inverted lists for those terms where the query vector has a nonzero value. The inventors compared their system to computing the dot products with a publicly available inverted file-base IR system, SMART (available from direct/pub/smart on ftp.cs.cornell.edu.).

The inventors examined using the sampling aspect of the invention by itself, and in conjunction with dot product evaluation of high scoring matches. The use of sampling alone has the advantage of reduced storage requirements, since after preprocessing, only the sample matrix is needed to process queries. The combined algorithm, however, yielded more accurate results. All running times listed include preprocessing time for reading the matrix and building the sample matrix.

For dense data, the running time depends linearly in the number of dot products evaluated. However, sparse matrix techniques make a computation of the full product much more efficient than evaluating all dot products individually. For the Reuters dataset above, the time required for sparse multiplication was comparable to evaluation 10% of dot products individually. Hence, the combined algorithm is effective for sparse data only when a very small fraction of dot products are being evaluated.

The performance of the invention was tested with respect to the goals of identifying all k nearest neighbors and identifying all high matches. For these goals, the full exact matrix multiplication achieves perfect results. The sampling-based approaches are faster but incur some loss of accuracy in the results.

In terms of these tradeoffs, the invention was used to estimate for each document, the largest of the $22,173^2$ values produced by taking the dot product of the document with all database document vectors. As a control, SMART was used to compute all the dot products and output the top 11 nearest neighbors for each query document. This took 69 minutes. Two sampling runs were done, one taking 337,826,300 samples, yielding a running time of 7:20 minutes (9 times faster than SMART), and one taking 136,777,240 samples, with a running time of 4:35 (15 times faster than SMART). The sampling runs correctly found the nearest neighbor of a document 9,352 times (42.2%) in the first run, and 6,311 times (25.%%) in the second. The nearest neighbor was in the top 10 documents (breaking ties arbitrarily) 16,596 times (74.8%) for the first run, and 12,558 times (56.6%) in the second. It should be noted that in many cases the nearest neighbor is one of a substantial number of documents with very close similarities to the query document, and the above statistics penalize the sampling method for finding those very similar documents.

Figure 6:
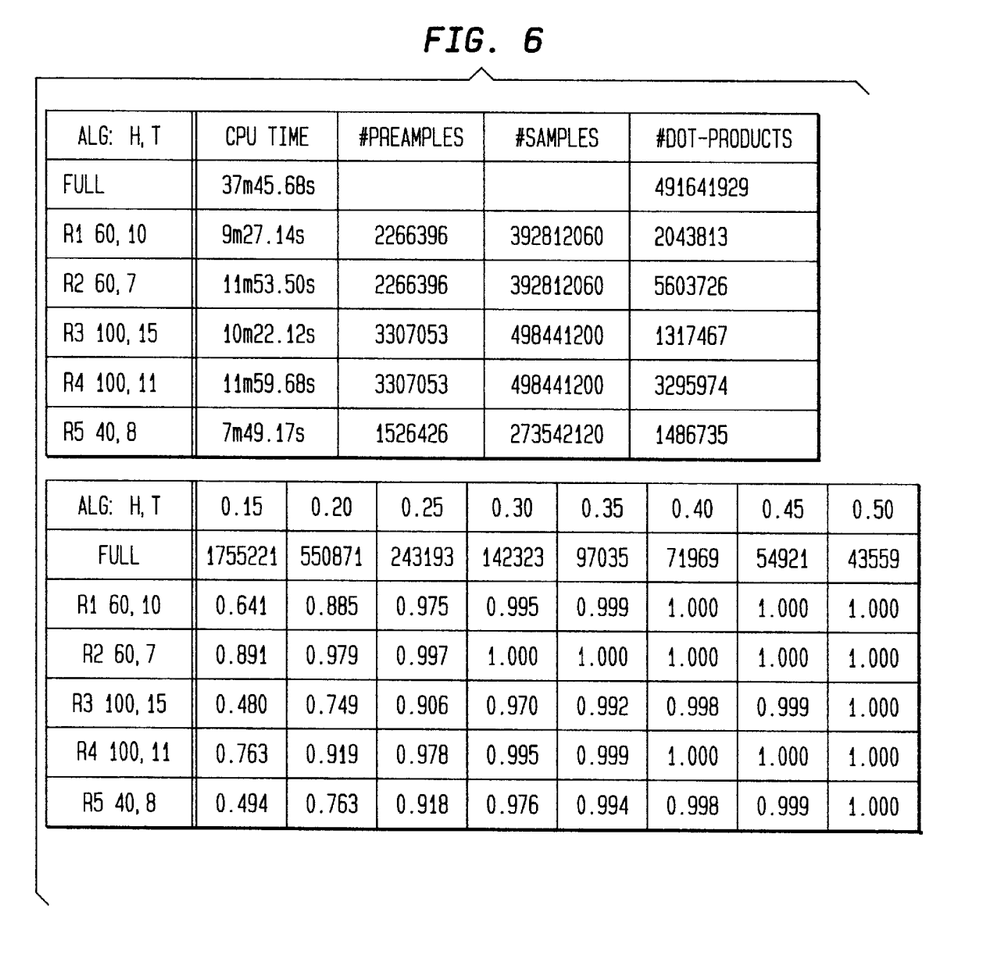
FIG. 6 illustrates a fifth set of experimental data related to the improved retrieval system of the invention.
Figure 7:
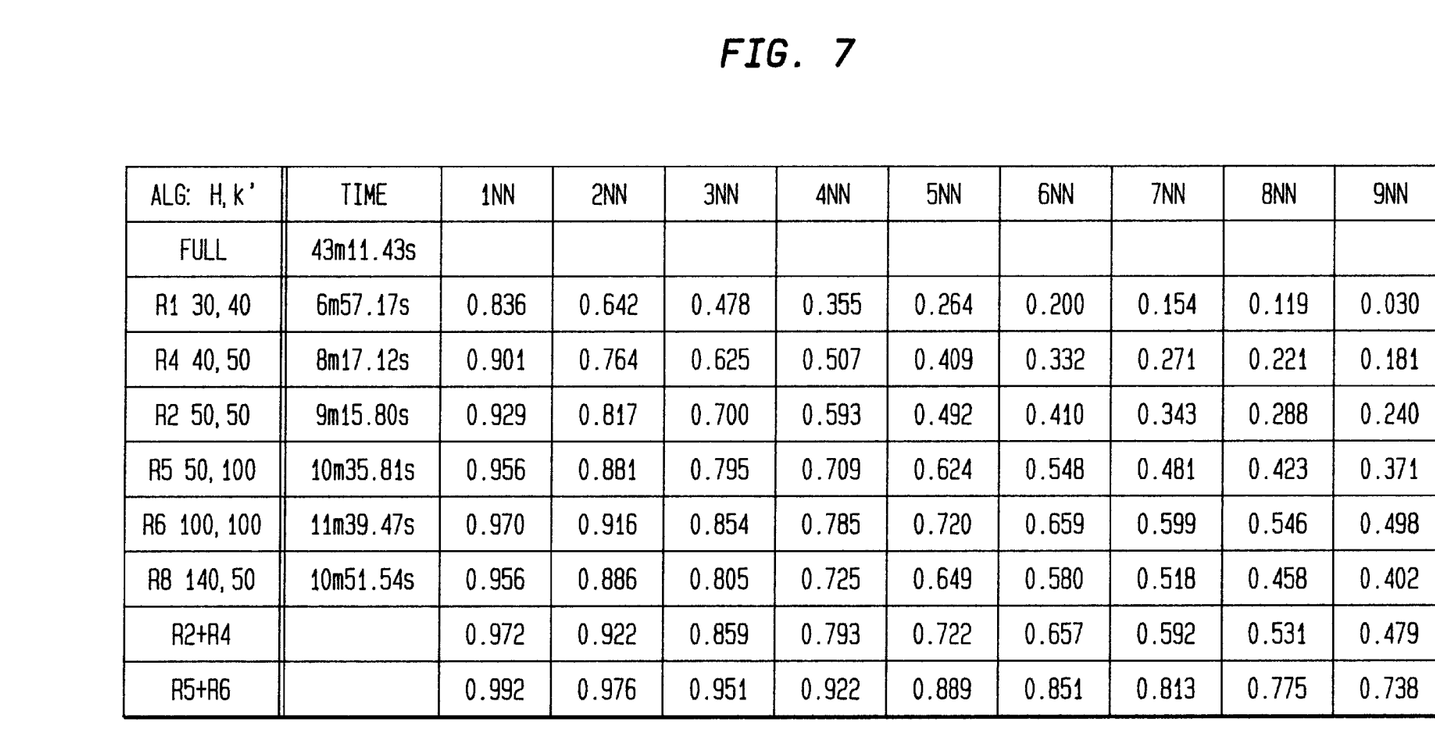
FIG. 7 illustrates a sixth set of experimental data related to the improved retrieval system of the invention.
Figure 8:
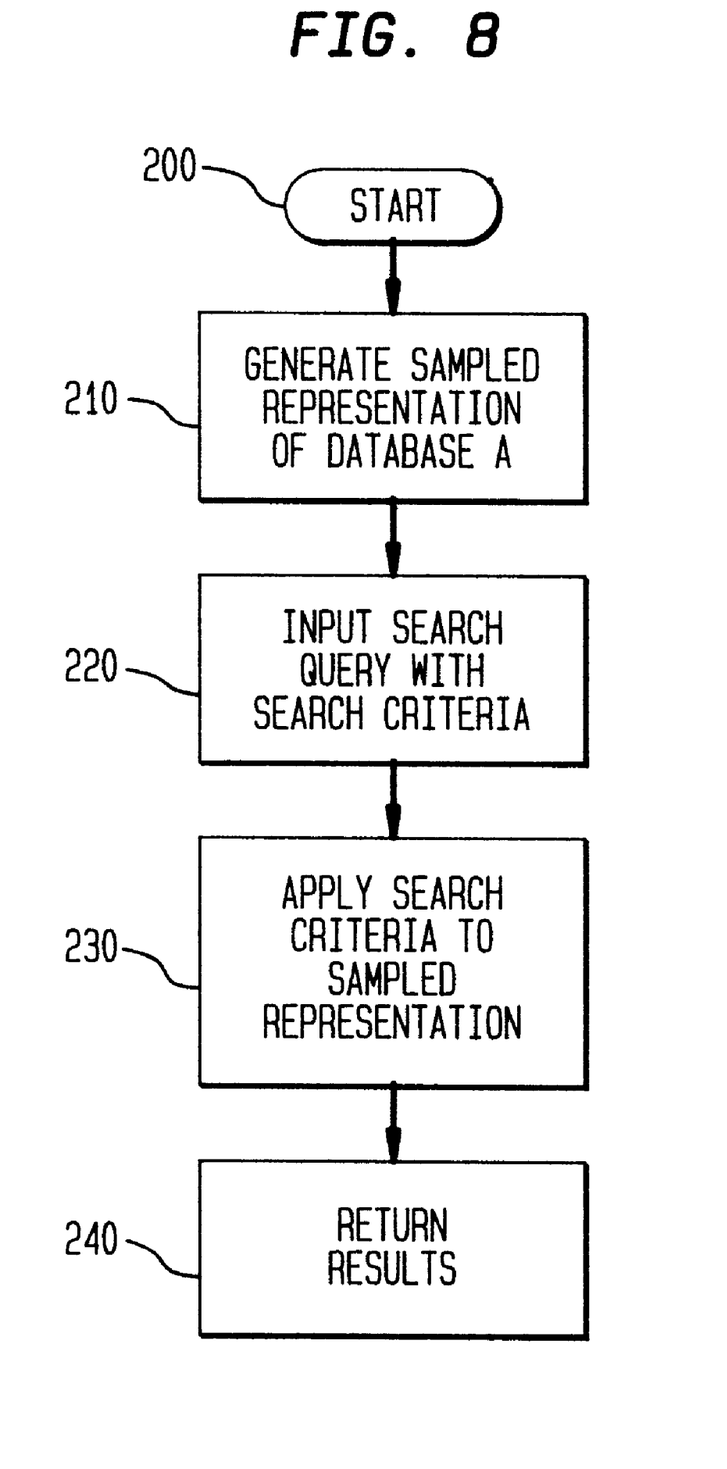
FIG. 8 illustrates a flowchart of the operation of the improved retrieval system of the invention.

In terms of identifying all high matches, the invention was used with parameters H and T and computed the dot products for all scores over T. Algorithm Full computed (using efficient sparse multiplication) all dot products. FIG. 6 lists the parameters values H and T and the performance results for each of the algorithms. The first table lists for each algorithm, the number of precomputed samples (size of sample matrix), the number of samples needed in the execution, and the number of dot products computed. The second table lists in the first line the total number of matches of values above 0.15–0.85. Other lines contain the fraction of such matches found by each algorithm.

The task of identifying all k nearest neighbors has been considered. The invention in this respect used a combined algorithm with parameters H and k'. Sampling is applied first with parameter H. The k' highest scores are identified, and the exact dot products for these instances were computed. The algorithm returns these k' values sorted according to dot product value. The performance measure is how many of the true nearest neighbors are all in this set. That is, identify $k \leq k'$ such that all k nearest neighbors are among the k' values returned. In the algorithms used here, the same parameter H for all queries was used. The performance of the invention can be improved further for NN identification by determining H individually and online for each query. When the nearest neighbors have high values a smaller number of samples is needed. In Table 3 results for several choices of H and k' are listed. For each run, the running time is listed, and the fraction of queries for which at least k Nearest Neighbors were correctly identified (for k=1, . . . , 9) . The last two rows provide the performance when the 10 to documents from two algorithms are combined.

When k nearest neighbors are not identified correctly, it is often because the kth nearest neighbor has a low match and is close in value to a large set of other instances (in that case, it is not likely to be relevant).

From review of the foregoing, the dense matrix comparison strongly favors the improved retrieval system of the invention over the prior art. There has been little progress in speeding up retrieval with LSI document representations, beyond the obvious expedients of using parallel hardware or using few latent dimensions. To achieve a speedup of 5 to 10-fold by dropping dimensions would require using only 32–64 dimensions, which would substantially impact effectiveness.

Sparse matrix results are not a primary emphasis of the invention, since a wide variety of methods of speeding up inverted file based scoring are already known, particularly when only the top scoring documents are needed and exact results are not necessary. These include compressing inverted files (to reduce I/O), using lower precision arithmetic, ignoring some inverted lists or parts of inverted lists, and limiting the number of document score accumulators maintained. A 10 to 15-fold speedup over inverted file based matching therefore must be considered in the context of these alternative optimizations. The invention in this context does not have the nicer properties that the expected values of our scores are equal to the true scores and the variance is predictable and well behaved.

Practice of the improved retrieval system of the invention may be possible using a different and perhaps conceptually simpler scoring algorithm that randomly samples d'<<d coordinates and performs the dot products computations on these coordinates only, yielding approximate results. The running time is reduced by a factor of d/d'. The actual dot products can be approximated by multiplying the abbreviated values with d/d'. The expected value of this "scores" equals the actual values, as for our method. However, the variance is typically much higher, in particular when most of the contribution to a high dot products is from a few coordinates. Generally, the variance depends on the weight distribution of the instance vectors and therefore, is unpredictable. (That is, scores of two instances with equal dot product could have very different variance).

The foregoing description of the improved retrieval system 10 of the invention is illustrative. Variations in construction and implementation will occur to persons skilled in the art. All cited references are incorporated herein by reference, as fully as if set forth herein. The scope of the invention is intended to be limited only by the following claims.

What is claimed is:

1. A retrieval system for retrieving data from a database, the database comprising records each having a set of attribute values and a record identifier, comprising:

a database sampling unit, for sampling from the records in the database and generating a sampled representation of the database according to a probability distribution over the records of the database, the probability distribution being constructed as a function of the attribute values in the records, and the database sampling unit being constructed to generate a weighted, directed graph representing the database, the database sampling unit determining the probability distribution by random walks on the weighted, directed graph;

a query input unit, for receiving a database query; and a query processing unit, operatively connected to the query input unit and to the database sampling unit, which applies the database query to the sampled representation of the database to return results.

2. A retrieval system according to claim 1, wherein the database sampling unit is constructed to output a set of lists of record identifiers, as the sampled representation.

3. A retrieval system according to claim 2, wherein the query processing unit uses the sampled representation of the database to compute an approximation of the dot product between the database query and each database record, and return the resulting approximate values.

4. A retrieval system according to claim 3, wherein the query processing unit is constructed to return results only on records whose approximated dot product with the query exceeds a predetermined threshold.

5. A method of retrieving information from a database, the database comprising records each having a set of attribute values and a record identifier, comprising the steps of:

(a) sampling from records of a database, to generate a sampled representation of the database according to a probability distribution over the records and attributes of the database, i) the probability distribution being constructed as a function of the attribute values in the records, the construction being done by a weighted, directed graph representing the database, and ii) the database sampling unit determining the probability distribution by random walks on the weighted, directed graph;

(b) receiving a query input; and (c) applying the query input to the sampled representation to return results.

6. A method according to claim 5, further comprising the step of:

(d) outputting a set of lists of record identifiers as the sampled representation.

7. A method according to claim 6, further comprising the step of:

(e) calculating an approximation of the dot product between the query input and each database record, to return the results.

8. A method according to claim 7, further comprising the step of:

(f) returning results only on entries whose approximated dot product with the query input exceeds a predetermined threshold.

* * * * *